United States Patent [19]

Ruiz et al.

[11] Patent Number: 4,762,540
[45] Date of Patent: Aug. 9, 1988

[54] NOISE SUPPRESSION AND PARTICLE SEPARATION APPARATUS FOR HIGH PRESSURE GASEOUS FLUID FLOWS

[75] Inventors: David M. Ruiz, Indio; Alvin S. Timmons, Santa Rosa, both of Calif.

[73] Assignee: Union Oil Company of California, Los Angeles, Calif.

[21] Appl. No.: 90,235

[22] Filed: Aug. 27, 1987

[51] Int. Cl.$^4$ .............................................. B01D 50/00
[52] U.S. Cl. ......................................... 55/276; 55/319; 55/441; 181/239; 181/257; 181/268; 181/272
[58] Field of Search .......................... 55/276, 319, 441; 181/239, 257, 268, 265, 272, 232, 217, 218

[56] References Cited

U.S. PATENT DOCUMENTS

| | | | |
|---|---|---|---|
| 228,744 | 6/1880 | Eames | 55/441 |
| 2,196,491 | 4/1940 | Chipley | 55/276 X |
| 2,600,262 | 6/1952 | Powers | 55/276 |
| 2,640,557 | 6/1953 | Gaffney | 181/265 X |
| 3,454,129 | 7/1969 | Everett | 181/268 |
| 3,616,627 | 11/1971 | Everett et al. | 55/276 X |
| 3,688,865 | 9/1972 | Smith | 181/218 |
| 3,887,032 | 6/1975 | Harris | 55/319 X |
| 4,106,562 | 8/1978 | Barnes et al. | 166/97 |
| 4,108,276 | 8/1978 | Hall et al. | 181/272 X |
| 4,161,222 | 7/1979 | Pye | 175/66 |
| 4,162,904 | 7/1979 | Clay et al. | 55/276 |
| 4,241,805 | 12/1980 | Chance, Jr. | 181/232 |
| 4,261,708 | 4/1981 | Gallagher | 55/51 |
| 4,353,434 | 10/1982 | Norris | 181/258 X |
| 4,482,451 | 11/1984 | Kemp | 208/161 |
| 4,672,808 | 6/1987 | Leonhard et al. | 60/286 |

Primary Examiner—Kathleen J. Prunner
Attorney, Agent, or Firm—Howard R. Lambert; G. Wirzbicki; D. Sandford

[57] ABSTRACT

Noise suppression and particle separation apparatus for flows of high pressure, high velocity, particle-laden, gaseous fluid, such as geothermal steam, comprises a gaseous fluid conduit that has axially installed around its discharge end a larger diameter, cylindrical inner expansion chamber having a number of flow-dividing fluid discharge openings at which fluid flow diffusing elements are connected for receiving and diffusing the flow of gaseous fluid from the apertures. A still-larger diameter, cylindrical noise suppression chamber is axially mounted around the inner chamber and flow diffusing elements. The diffusion elements increase the fluid flow noise frequency range and sound deadening material installed in the outer chamber absorbs noise in this higher frequency range so that the venting fluid noise level outside the apparatus is no more than about 95 dB. To enable fluid expansion, the fluid conduit diverges at its outlet end, the inner chamber has a diameter at least about twice that of the flow inlet conduit and the outer chamber has a diameter that is at least about twice that of the inner chamber. Flow direction and velocity changes in the apparatus cause the disengagement of particulates entrained in the fluid flow.

40 Claims, 3 Drawing Sheets

NOISE SUPPRESSION AND PARTICLE SEPARATION APPARATUS FOR HIGH PRESSURE GASEOUS FLUID FLOWS

BACKGROUND OF THE INVENTION

1. Field of the Invention

The present invention relates generally to noise suppression and gas-liquid-solids separation apparatus for use with flows of high pressure and velocity, particle-laden, gaseous fluids and more particularly to such apparatus for venting flows of steam into the atmosphere from geothermal steam production wells.

2. Background Discussion

Indigenous geothermal steam is, in many regions of the world where it is abundant and reasonably accessible, used to produce commercially significant amounts of electric power at rates which are usually competitive with power produced by more conventional energy sources. About two percent of the electric power needs in the State California are, for example, recently estimated to be generated by geothermal steam, principally at The Geysers in Northern California.

Geothermal steam is typically obtained from deep production wells at high natural temperatures and pressures. Although usually of good, near-usable quality, geothermal steam may entrain significant or even substantial amounts of debris, such as silt, sand and pieces of rock, swept by the steam from the subterranean producing formation. As a result, geothermal steam is ordinarily flowed through a wellhead separator in which particulate matter and any steam condensate caused by reduced temperature and/or pressure in the well bore are removed from the steam. From the separator, the clean steam is piped to conventional steam turbine generators which produce the electric power. Typical flow rates of the geothermal steam produced from a single well may exceed 200,000 pounds per hour, and the wellhead pressure of the steam may be in the range of about 100-400 PSIG.

The venting of large amounts of steam from geothermal steam wells is sometimes necessary for purposes of maintaining well integrety during well shut-in periods and for cleaning out the build up of debris from operating wells.

Relative to maintaining well integrity, the complete shutting in of a geothermal steam well for a protracted period of time commonly causes the well bore to cool down to an extent that steam from the formation condenses in the bore. This condensate gradually fills the well to an extent that the well may become non-producing and require costly rework before again becoming productive. Continual venting of steam from shut in geothermal steam wells is, therefore, desirable in order to maintain the bore holes at high enough temperatures to prevent substantial condensation.

Although well venting flow rates for maintaining well integrity during shut-in periods may vary from well to well, depending upon well characteristics, venting rates of between about 20,000 and about 45,000 pounds per hour are common. Steam being vented at this rate from shut-in wells typically contains significant amounts of formation and well bore debris, as well as some condensate. The amount of debris and condensate entrained in the venting steam understandably varies from well to well; however, weight percentages of entrained debris and/or condensate on the order of about ten percent may be encountered with some wells.

With respect to cleaning debris out of producing geothermal steam wells, typical production flow velocities of geothermal steam may be insufficient to keep all formation and well bore debris and/or condensate flushed out of some wells. Gradually, and in some wells fairly rapidly, debris accumulates in many well bores and production of the geothermal steam from the wells is increasingly choked off. The associated electrical power production then drops and shutdown of the generating facility may be necessary.

As a rule, well condition is determined by monitoring wellhead steam pressure; a decrease in this pressure indicates probable well choking by accumulated debris and/or condensate in the well bore. When such a condition is identified, the steam flow is ordinarily diverted to a wellhead vent conduit through which the steam is discharged at a sufficient velocity to flush out the well bore. This venting operation usually restores steam production without additional well rework. Depending upon well condition, steam venting may be necessary for several or many hours.

Two major problems are, however, commonly associated with atmospheric venting of geothermal steam wells for either of these (or other) purposes: (1) an extremely loud noise, comparable in many cases to that of large jet aircraft at take off, is made by the venting steam blasting into the atmosphere from the vent pipe, and (2) comparatively large amounts of debris, ranging in size from fine silt to pieces of rock several inches across, is discharged from the vent pipe with the steam. With regard to the latter, larger ejected particles normally rain down around the wellhead and may create a hazard to workers and equipment, while smaller particles are carried aloft and may be dispersed over large areas by prevailing winds and thereby cause environmental pollution problems.

Some type of muffler and particle separators are thus commonly used to reduce the noise and to separate at least larger particulates from the venting steam. Nevertheless, in many habitated regions, particularly in the United States, new safety and pollution standards and/or the strict enforcement of existing standards may limit both the noise that can be made and the amount of particulates that can be discharged into the atmosphere by geothermal steam venting to below that which is normally provided by most commonly used mufflers and separators. Consequently, more effective noise suppression and more efficient particulate separation are presently needed in some areas to enable the continued production of geothermal steam.

Because most geothermal steam wells require venting only at relatively infrequent intervals, it is economically desirable that any noise suppression and particle separation apparatus be transportable from one well to another as the need arises, rather than being permanently installed at each well. Such transportability requires that the apparatus be relatively compact and not too massive so that it can be handled by commonly available transporting equipment. However, difficulties are encountered with constructing noise suppression and particle separation apparatus which are effective for both quieting and cleaning the steam and which are also readily transportable between steam wells.

Apparatus for separating particulates from geothermal fluids without atmospheric venting are disclosed, for example, in U.S. Pat. Nos. 4,106,562 to Barnes, et al.

and 4,261,708 to Gallagher. These patents disclose flow control apparatus for separating and accumulating debris produced on line from a geothermal well without loss of fluid temperature or pressure. However, neither of the disclosed apparatus includes means for significantly reducing the loud noise caused by flow of the fluid and neither is designed or configured for periodically cleaning debris and/or condensate out of a choked geothermal steam wellbore by venting the steam into the atmosphere.

Noise reduction apparatus for in-line pressure letdown of high pressure gas flows are, for example, disclosed in U.S. Pat. No. 4,241,805 to Chance, Jr. However, the disclosed apparatus for controlling noise during transfer of gas from a high pressure conduit to a low pressure conduit is considered by the present inventors to be impractical for use with flow rates of tens of thousands of pounds per hour, such as are typically involved in geothermal steam well venting operations. Moreover, the disclosed apparatus is considered to be completely unsuitable for use with gas flows containing significant amounts of particulate matter.

Rock "mufflers," which typically comprise either an excavated pit or large vessel filled with crushed and/or broken rock, are frequently used for venting steam from geothermal steam wells. Steam discharged from a vent near the bottom of the pit or vessel loses energy as it diffuses around the rock before exiting to the atmosphere from the surface of the "muffler." Such apparatus have, however, various disadvantages. For instance, separate apparatus must be provided for each well because they are too massive, even in the vessel configuration, to be transportable between wells. Furthermore, such rock-type "mufflers" cannot easily be cleaned of accumulated debris from the steam, nor can they effectively clean the steam being vented. Also, such apparatus permanently occupy valuable and often scarce ground space near the wellhead and may also undesirably interfere with access to various other equipment.

Therefore, to ensure compliance with increasingly restrictive environmental and pollution control/abatement regulations at the state and local level, while still enabling commercially economical geothermal steam production, improved, cost effective noise suppression and particle separation apparatus are needed for venting relatively large flows of steam from geothermal steam wells, and the need exists for such apparatus which are readily transportable from one well to another as venting is required. It is to such improved apparatus that the present invention is primarily directed.

SUMMARY OF THE INVENTION

A noise suppression and particle separation apparatus, according to the present invention, is provided for quieting and/or cleaning a flow of high pressure, high velocity, particle-laden, gaseous fluid, for example, particle-laden geothermal steam. The apparatus comprises a fluid conduit which receives the flow of gaseous fluid, an inner expansion chamber into which the gaseous fluid is discharged from the conduit and permitted to expand, and flow diffusing means disposed around outlet openings in the inner chamber for receiving and diffusing the flow of gaseous fluid therefrom. Included is (1) an outer expansion chamber which is mounted around the inner chamber and (2) diffusing means and into which the gaseous fluid from the diffusing means is received and permitted to further expand. The inner chamber preferably has a replaceable flow impingement member. The outer expansion chamber has a large gaseous fluid discharge opening and preferably includes sound absorbing means for substantially reducing the noise made by the flow of gaseous fluid into and through the apparatus.

The inner expansion chamber and diffusing elements are preferably configured to increase the fluid noise frequency range to between about 2000 and about 16,000 Hz from a typical frequency range of between about 200 and about 500 Hz associated with noise made by the fluid discharging from the fluid conduit into the inner chamber. The sound absorbing means in the outer chamber preferably comprise a sound deadening blanket installed around the inside of the chamber outwardly from the diffusing elements and/or a plurality of annular sound deadening elements installed in the outer chamber at the outlet thereof in the path of discharging fluid. The sound deadening material is selected to absorb noise in the frequency range of that provided by the diffusing elements, the outer chamber preferably attenuating the noise of the fluid flow into and through the apparatus to a level outside the apparatus of no more than about 95 dB.

According to an embodiment of the invention, the inner and outer expansion chambers are generally cylindrical and are coaxially disposed around a riser portion of the fluid conduit. The inner chamber has at least one and preferably a plurality of fluid discharge apertures in its side wall. The flow diffusing means comprise a like number of flow diffusion elements, preferably pipe stubs, which are connected to the inner expansion chamber to receive and diffuse the flow of gaseous fluid from the chamber discharge apertures and which have a number of small, side wall discharge openings. Preferably the total discharge opening area of each element is at least about as great as the cross sectional area of the element and the total discharge opening area of all the elements is at least about as great as the cross sectional area of the inner expansion chamber.

The inner expansion chamber preferably has a diameter substantially greater than the fluid discharge opening in the fluid conduit, and the inner expansion chamber, the diffusing means and the outer expansion chamber are relatively configured so that the fluid pressure in the inner chamber is substantially less than, preferably only about 3 to about 30 percent as great as, the fluid pressure in the riser upstream of the discharge opening therein. The outer expansion chamber has a diameter substantially greater than that of the inner chamber and is configured to operate at about atmospheric pressure. The fluid conduit may be stepped in diameter to permit fluid expansion therein before the fluid is discharged therefrom into the inner chamber.

Abrupt flow direction and velocity changes in the apparatus cause disengagement of particulates entrained in the fluid; sumps are provided in the inner and outer chambers to receive and retain the disengaged particulates.

BRIEF DESCRIPTION OF THE DRAWINGS

The present invention may be more readily understood by the following detailed description when taken in conjunction with the accompanying drawings in which.

DESCRIPTION OF THE PREFERRED EMBODIMENT

Figure 1:
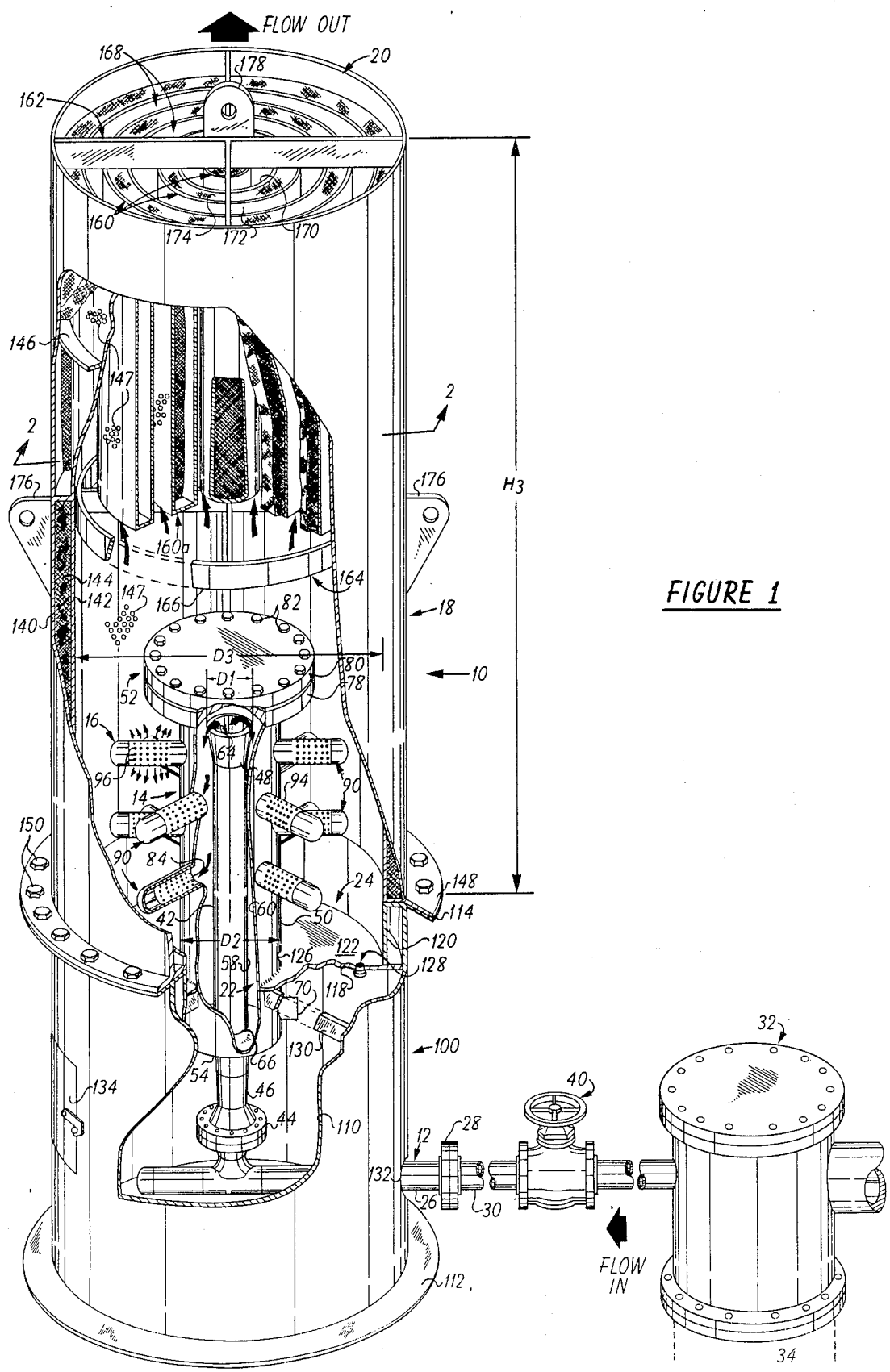
FIG. 1 is a cutaway perspective drawing of the noise suppression and particle separation apparatus of the present invention, showing the manner in which the apparatus is constructed.

Shown in the cutaway perspective drawing of FIG. 1 is noise suppression and particle separation apparatus 10 in accordance with the present invention. As more particularly described below, apparatus 10 is configured for venting a relatively large flow of high pressure, high velocity, particle-laden, gaseous fluid—in particular, geothermal steam—into the atmosphere. Apparatus 10 is constructed so as to suppress or muffle the loud noise caused by the blast-like discharge of the fluid flow into the apparatus; that is, the loud noise that would otherwise be caused by venting the flow of high pressure, high velocity, gaseous fluid directly into the atmosphere. In addition, apparatus 10 is constructed so as to separate or disengage particulates, for example, sand, silt, broken rock and steam condensate (in the case of the fluid being geothermal steam) from the flow of gaseous fluid venting through the apparatus, thereby reducing pollution and any hazard which might otherwise be caused by ejecting rock and debris into the air.

Apparatus 10 is, as described and illustrated herein, particularly configured and well suited for suppressing the noise of, and separating particulates from, a relatively large flow of high pressure, high velocity, debris-laden geothermal steam which must be vented from a geothermal steam well, for example, to clean out the well. However, it is to be understood that the present invention is not so limited and that apparatus 10 may alternatively be used to suppress the noise of and/or disengage particulates from other flows of high pressure, high velocity, gaseous fluids.

Figure 2:
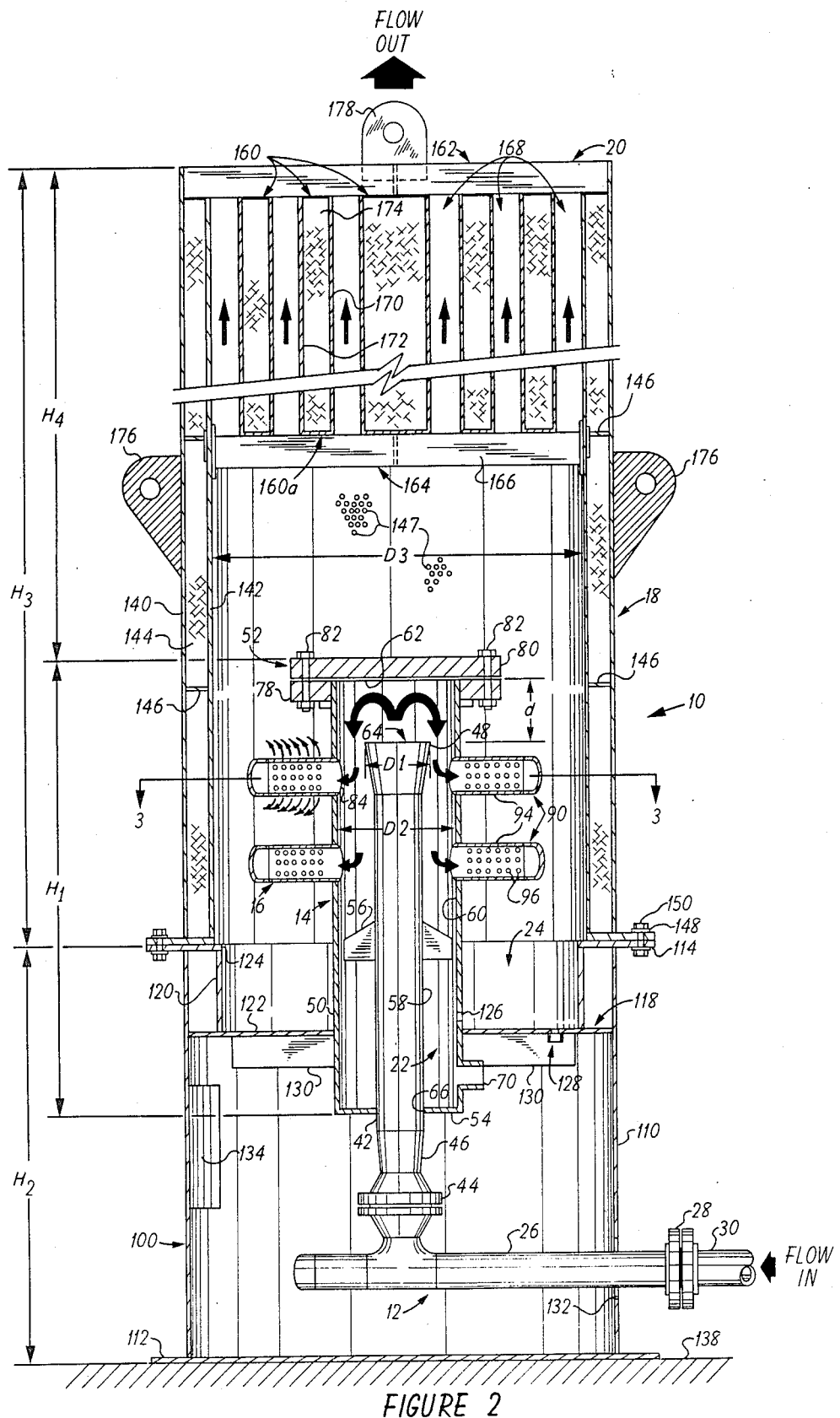
FIG. 2 is a vertical cross-sectional view, taken along line 2—2 of FIG. 1, showing the configuration and arrangement of a fluid conduit, an expansion chamber, flow diffusing means and a sound-deadening shell which principally comprise the apparatus.

Generally comprising apparatus 10, as shown in FIGS. 1 and 2, are a gaseous fluid conduit assembly 12, an inner or first fluid expansion chamber 14, flow diffusing means 16 and an outer or second expansion chamber 18, which may also or alternatively be referred to as a sound-deadening shell. The flow of high pressure and velocity gaseous fluid to be quieted and cleaned enters apparatus 10 through fluid conduit assembly 12, blasting therefrom into inner expansion chamber 14, which is operated at a much reduced pressure relative to the fluid pressure in the conduit.

From first expansion chamber 14, the gaseous fluid, which has expanded therein to a greatly reduced pressure, is discharged into the second expansion chamber or sound-deadening shell 18 through fluid diffusing means 16. Within chamber or shell 18, which preferably operates at approximately atmospheric pressure, the greatly divided flow of gaseous fluid discharged from diffusing means 16 merges and is vented into the atmosphere through a large vent or opening 20 in the top of the chamber.

The flow direction and velocity of the gaseous fluid are abruptly changed several times as the fluid flows through apparatus 10, and the flow velocity (which relates to the particle transporting power of the fluid) is generally reduced due to fluid pressure reductions. As a result, well debris and/or condensate entrained in the fluid are caused to be separated from the fluid flow and fall or are impelled by their momentum to lower, sump regions 22 and 24, respectively, of first and second chambers 14 and 18.

The loud, blasting noise caused by the discharge of a high pressure, high velocity flow of gaseous fluid from a relatively small pipe into the atmosphere or into a low pressure chamber (such as inner expansion chamber 14) tends to be in a relatively low frequency range and is, therefore, very difficult to effectively attenuate or suppress. By diffusing the flow of the gaseous fluid from first expansion chamber 14 into shell 18 through diffusing means 16 which has, as described below, a great many small diameter discharge openings, the frequency of the noise has been found to be increased to a range which enables the noise to be more easily suppressed in or by outer chamber 18.

More particularly described, and as shown in FIGS. 1 and 2, fluid conduit assembly 12 comprises a generally horizontal, fluid inlet pipe section 26 which is detachably connected, by a standard pipe coupling 28, to an existing wellhead vent pipe 30. Such pipe 30 is, in turn, connected to a preexisting wellhead structure 32 atop an existing geothermal steam well 34. The high pressure, high velocity fluid flow from vent pipe 30 into fluid conduit inlet section 26 is regulated by a valve 40.

Additionally comprising fluid conduit assembly 12 is an elongate, upright discharge section or riser 42. Conduit sections 26 and 42 are interconnected by a standard, flange-type coupling 44. It is preferred, in order to permit the flow of high pressure, high velocity gaseous fluid to expand in stages and lose velocity so that the particulates can be effectively separated in apparatus 10 from the flow of gaseous fluid, that riser 42 be larger in diameter than the outlet of conduit section 26. Accordingly, a standard short diverging pipe expander 46, which increases in pipe size to match the upstream and downstream pipe sizes, is installed at the lower end of riser 42, just downstream of coupling 44. It is also preferred, for the same reason, that the upper, outlet end of riser 42 be expanded to a larger diameter, $D_1$. For this purpose, there is connected at the upper end of riser 42 a standard, short diverging pipe expander 48.

Figure 3:
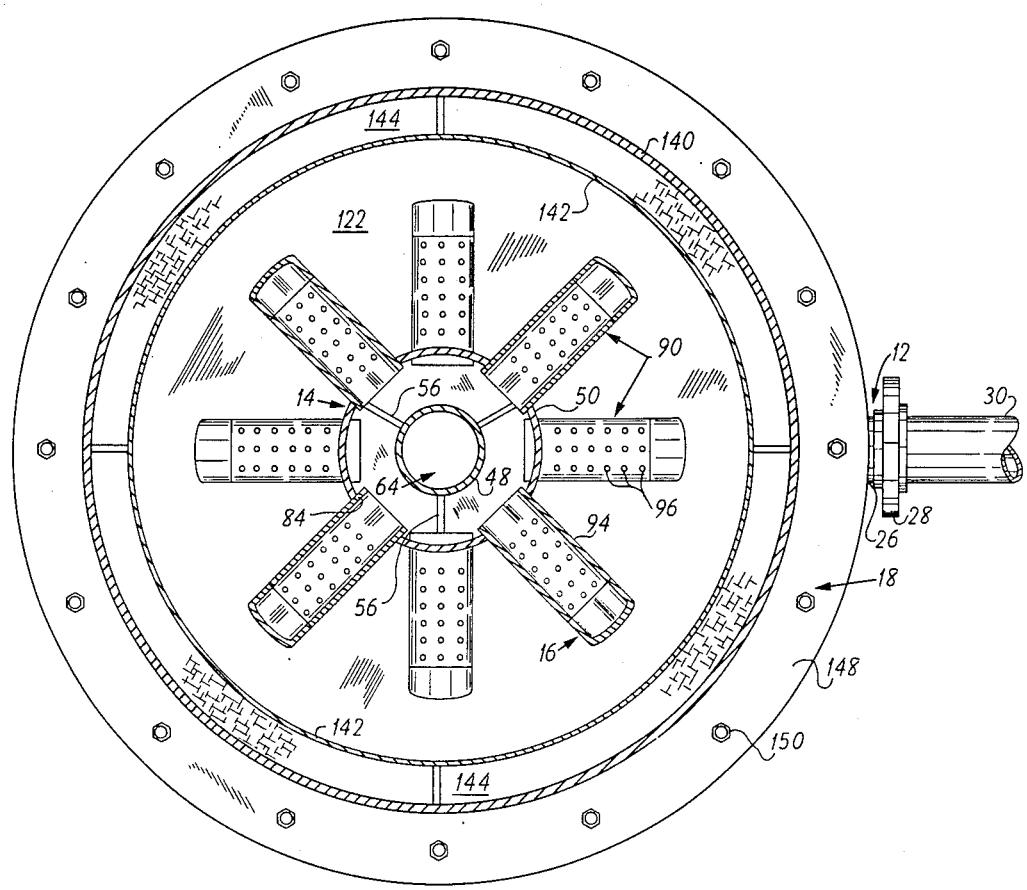
FIG. 3 is a transverse cross-sectional view, taken along line 3—3 of FIG. 2, showing the concentric arrangement of the fluid conduit, expansion chamber, diffusing means and sound-deadening shell.

As shown in FIGS. 1-3, first expansion chamber 14, which is substantially closed, is generally cylindrical in shape and comprises a tubular side wall 50, a top assembly 52 and a bottom plate 54. Several gussets 56 (FIG. 2) ensure that expansion chamber 14 coaxially surrounds the upper portion of riser 42, the gussets being connected between an outer surface 58 of the riser and an inner surface 60 of chamber wall 50 at about mid height of chamber 14. As shown (FIG. 2), gussets 56 attach chamber 14 to riser 42 at a height which spaces a flow impingement or wear surface 62 of chamber top assembly 52 a relatively short distance, d, above an outlet opening 64 at the upper, flow discharging end of pipe expander 48. The extended height, $H_1$, of chamber 14 is such that, with the above-described axial spacing, d, between flow impinging surface 62 and flow discharge opening 64, the chamber encloses most (and preferably at least about 75 percent) of the length of riser 42.

The diameter, $D_2$, of inner expansion chamber 14 is substantially greater, for example, at least about twice as great, as diameter, $D_1$, of discharge opening 64 at the upper end of pipe expander 48.

A central aperture 66 in chamber bottom plate 54 enables the plate to fit closely around riser 42. Plate 54 is preferably joined, as by welding, to riser 42 to thereby provide a liquid-tight seal between the bottom of chamber 14 and the riser. Sump 22 in lower regions of expansion chamber 14 is annular in shape, being defined by external surface 58 of riser 42, inner surface 60 of chamber side wall 50 and bottom plate 54. A sump drain 70 extends through chamber side wall 50, just above bottom plate 54, to enable draining condensate from sump 22.

Inner chamber top assembly 52 comprises a lower, annular flange 78 and an upper, blind flange or wear member 80, the latter having impingement surface 62 as its flow-exposed bottom surface. Lower flange 78 is joined to the top of chamber side wall 50, and upper flange 80 is detachably connected to the lower flange by a circle of bolts 82 near the periphery of the flanges. This configuration enables upper flange 80 to be replaced from time to time when it becomes excessively eroded by the sand blasting action of the particle-laden gaseous fluid which is directed at surface 62 from riser discharge opening 64.

Chamber side wall 50 is formed having a plurality of discharge apertures 84 which are preferably arranged in several staggered, circular rows around the wall in upper regions thereof (four such rows being shown in FIG. 1). The angular spacing between adjacent apertures 84 in each row is preferably equal and, when there are four apertures in each row, the preferred angular spacing is 90 degrees. Also, preferably, all apertures 84 have the same diameter which is smaller than diameter, $D_1$, of riser discharge opening 64, usually being less than about 75 percent of the diameter $D_1$.

The combined cross-sectional area of all apertures 84 is preferably about equal to the cross sectional area of inner expansion chamber 14. The undivided flow of gaseous fluid into inner expansion chamber 14 from riser discharge opening 64 is thus outwardly discharged from the chamber through apertures 84 as a number of divided flows or subflows.

Comprising flow diffusing means 16 are a plurality of individual flow diffusing elements 90, the number of which is equal to the number of flow discharging apertures 84 in inner chamber side wall 50. Each such element 90 comprises a relatively short conduit or pipe stub closed at its outer end and connected at its open, inner end to inner expansion chamber side wall 50, at or through a corresponding flow discharge aperture 84. As shown in FIGS. 1–3, diffusing elements 90 are preferably connected to inner chamber side wall 50 so as to project radially outwardly therefrom.

Formed through a side wall 94 of each diffusing element 90 is a relatively large number of small diameter, flow apertures 96 through which the sub-flow of gaseous fluid discharged into the element from the corresponding inner chamber discharge aperture 84 is diffused into outer expansion chamber 18. Small apertures 96 also cause or provide a flow noise in a relatively high frequency range which can be effectively absorbed in outer expansion chamber 18, as described below. Although the number of apertures 96 in each diffusing element 90 is not critical, it is nevertheless preferred that the combined area of all the apertures in any element be at least about equal to the internal cross sectional area of the element itself. It is also preferred that the total area of all apertures 96 in all diffusing elements 90 be at least about equal to the transverse cross sectional area of inner chamber 14 in the region of the elements.

A base or pedestal 100, upon which outer expansion chamber 18 is mounted (as described below) comprises a cylindrical side wall 110 having a height, $H_2$; an annular bottom, support or mounting flange 112 and an annular top, connecting flange 114. Top flange 114, besides extending outwardly from side wall 110, extends radially inwardly from the side wall a short distance towards inner chamber 14. The height, $H_2$, of pedestal side wall 110 is such that top flange 114 is positioned a short distance below the lowest row of diffusing elements 90 projecting outwardly from inner expansion chamber 14.

Installed radially between the outer surface of inner chamber side wall 50 and an inner surface of pedestal side wall 110, a relatively short distance (for example, less than about a foot) below top flange 114, is an annular member 118 which forms the bottom of outer chamber sump 24 (FIG. 2) and which also connects pedestal 100 to inner chamber 14. A cylindrical inner wall member 120, connected inwardly of pedestal side wall 110 between an upper surface 122 of member 118 and an inner edge 124 of top flange 114, forms the outer wall of sump 24. Cross members 130 are connected between inner chamber side wall 50 and pedestal side wall 110 beneath member 118 to provide support therefor and to rigidly interconnect inner chamber 14 and pedestal 100.

A drain aperture 126 is formed in inner chamber side wall 50, in lower regions of outer chamber sump 24. Liquid (condensate) from inner chamber sump 22 flows outwardly through aperture 126 into outer chamber sump 24, due to the higher pressure in inner chamber 14 (assuming sump drain 70 is closed), thereby assuring that the liquid level in the inner chamber sump remains below diffusing means 16. A sump drain 128 is connected through annular member 118 to enable draining outer chamber sump 24 to the outside of apparatus 10 through a conduit (not shown).

An aperture 132 is provided in lower regions of pedestal side wall 110 through which fluid conduit section 26 extends outwardly from apparatus 10. An access door 134 may be provided in pedestal side wall 110 in a location permitting access to fluid conduit pipe coupling 44 and the cleaning of sumps 22 and 24 through access openings (not shown) into the sumps. Bottom flange 112 is constructed to support the weight of apparatus 10 on any appropriate surface 138 and may be used to mount apparatus 10 to a convenient platform (not shown) which enhances the transportability or stability of the apparatus.

Outer expansion chamber 18, which encloses most of riser 42 and all of inner expansion chamber 14 and flow diffusing means 16, and which is mounted to top flange 114 of pedestal 100, may be a modified/customized Type 561 acoustical shell available from Vibration and Noise Engineering Corporation (VANEC), 2655 Villa Creek Drive, Suite 185, Dallas, Tex. 75234. Comprising outer expansion chamber 18 are a tall, cylindrical outer wall 140 and a similar, inner wall 142, the latter being spaced a short distance radially inwardly from the outer wall. Height, $H_3$, of outer expansion chamber 18 is such that the open upper end thereof, which defines fluid discharge opening 20, is a substantial height, $H_4$, above inner expansion chamber top assembly 52. An inner diameter, $D_3$, of outer chamber 18 is substantially greater than the diameter, $D_2$, of inner chamber 14, $D_3$ being preferably at least about twice $D_2$.

Installed between outer and inner walls 140 and 142 of outer chamber 18 is a sound absorbing blanket or member 144 which is made of a material, for example, fiberglass, selected for absorbing noise, preferably in the frequency range of that caused by the diffused flow of gaseous fluid through diffusing element apertures 96. Blanket 144 preferably extends entirely around the inside of outer chamber 18 and for the entire height, $H_3$, of walls 140 and 142. A number of small baffles 146 (FIG. 2) may be installed between outer and inner walls 140 and 142, respectively, to maintain the inner wall in a spaced apart relationship with the outer wall and to keep blanket 144 from settling due to vibration of outer chamber 18 during operation of apparatus 10. Inner wall 142 is preferably constructed of perforated sheet metal which may be backed up with a screen (not shown) which prevents the extrusion of sound deadening blanket 144 through inner wall openings 147.

An annular flange 148 is joined to the bottom of respective outer and inner walls 140 and 142 and is configured to mate with pedestal top flange 114. Bolts 150 detachably connect flanges 148 and 114 together to thereby attach outer chamber 18 to pedestal 100.

A plurality of radially spaced apart, sound absorbing or deadening elements 160, all but the center one of which are annular in shape, are attached by respective upper and lower frame assemblies 162 and 164 in upper regions of outer chamber 18 above inner chamber top assembly 52. Such elements 160 are coaxially mounted, with the axis of chambers 14 and 18, by frame assemblies 162 and 164, in a radially separated relationship, so that the gaseous fluid being discharged from outer expansion chamber 18 flows axially through open annular regions 168 between the elements. As shown in FIG. 2, outboard ends of upper frame assembly 162 are attached directly to outer wall 140, at the top thereof, lower frame assembly 164 including a mounting ring 166 bonded to inner wall 142. Each of sound deadening elements 160 preferably comprises a sound absorbing blanket sandwiched between inner and outer walls which, as in the case of chamber inner wall 142, are preferably constructed of perforated sheet metal and may be backed by a screen (not shown). By way of a representative example, an intermediate element, identified by the reference number 160a (FIGS. 1 and 2), comprises respective annular inner and outer walls 170 and 172 between which is disposed a sound deadening blanket 174, which may also be made of fiberglass.

A pair of apparatus lifting brackets 176 are mounted to opposite exterior regions of outer wall 140, at about the axial center of outer chamber 18; a third lifting bracket 178 is attached to upper frame assembly 162. Brackets 176 and 178 enable apparatus 10 to be lifted onto a transporting vehicle for moving from one geothermal steam well to another for steam venting purposes.

Although generally evident form the above description, operation of apparatus 10 is briefly summarized as follows: High pressure and velocity gaseous fluid enters apparatus 10 from wellhead vent pipe 30 through fluid conduit inlet section 26. Within conduit assembly 12, the gaseous fluid flow expands to a reduced pressure in pipe expander 46, flows upwardly through riser 42 and further expands in pipe expander 48 before being discharged through opening 64 into inner expansion chamber 14, in which the fluid pressure is substantially lower than just upstream of the discharge opening. Fluid upwardly discharged through riser opening 64 into chamber 14 is directed against chamber impingement surface 62, being caused by such surface to reverse direction and flow downwardly through the chamber. In order to exit chamber 14, the downwardly flowing fluid changes direction and flows radially outwardly through chamber side wall apertures 84 and into flow diffusing elements 90. The gaseous fluid again changes direction as it diffuses sidewardly from the large number of element openings 96 into outer expansion chamber 18, which is operated at atmospheric pressure. Inside outer chamber 18, the diffused fluid flows back upwardly, at a greatly reduced velocity as compared to the flow velocity into inner chamber 14, and outwardly through opening 20 into the atmosphere.

The flow of gaseous fluid is therefore seen to change direction and velocity abruptly several times as it travels through apparatus 10, thereby causing the effective disengagement of particulates from the flow, the well debris and/or condensate being impelled by their momentum or falling under gravity into sumps 22 and 24 from which they can later be removed.

EXAMPLE

By way of a specific, illustrative example, with no limitations thereby intended or implied, apparatus 10 may be constructed in the manner described below for a flow of about 20,000 pounds to about 45,000 pounds per hour of geothermal steam at a wellhead pressure of between about 100 and about 400 PSIG. In such case, fluid conduit inlet section 26 comprises commonly available, three inch, schedule 80, low carbon steel (LCS) pipe. In turn, riser 42 is constructed of four inch, schedule 80, LCS pipe and may extend upwardly into apparatus 10 to an elevation of about five feet. Pipe expander section 46 is accordingly a three-to-four inch section; pipe expander section 48 is a four-to-five inch section.

Side wall 50 of inner expansion chamber 14 comprises a 12 inch, schedule 80, LCS pipe having a length which makes the overall height, $H_1$, of Chamber 14 about $3\frac{1}{2}$ feet. Sixteen inner chamber flow discharge apertures 84, sized for receiving three inch pipe, are made in side wall 50 in four staggered, circular rows, each circular row having four apertures 84 spaced at 90 degree intervals. The four rows of apertures 84 rows are axially spaced apart about four inches, the upper row of apertures being centered about $9\frac{1}{2}$ inches below impingement surface 62 and the lower row of elements being centered about four inches above the top of pedestal annular flange 114 (FIG. 2).

Sixteen flow diffusing elements 90 are made of eight inch lengths of three inch, schedule 80, LCS pipe. Each element 90 has 72 $\frac{3}{8}$ inch diameter openings 96 arranged in six circumferential rows which are spaced about $\frac{3}{4}$ inch apart (center-to-center). Each row has 12 openings 96 spaced at 30 degree intervals, the openings in each row being axially aligned with corresponding openings in adjacent rows.

Inner chamber 14 is assembled to riser 42 so that the separation distance, d, between inner chamber flow impingement surface 62 and fluid discharge opening 64 at the upper end of riser 42 (that is, at the open end of expander section 48) is about six inches.

Pedestal side wall 110 is standard 42 inch LCS pipe having a height, $H_2$, of about $3\frac{1}{2}$ feet. Outer wall 140 of outer expansion chamber 18 may also be constructed of 42 inch LCS pipe or may be constructed of rolled LCS sheet metal, and has a height, $H_3$, of about seven feet, (for a total apparatus height, $H_2+H_3$, of about 10½ feet). The assembled height, $H_4$, of outer chamber 18 above inner chamber top assembly 52 is about five feet. Outer chamber inner wall 142 and element walls 170 and 172 may be formed of perforated stainless steel sheet having about ⅛ inch diameter holes 147 on about ½ inch centers. The back-up screening (not shown) is relatively fine mesh and is preferably made of stainless steel screen. Outer chamber sound deadening elements 160 extend about four feet down from discharge opening 20. The sound deading blankets, for example, blanket 174, used in elements 160, as well as blanket 144, are about three inches thick and comprise an electrical grade of fiberglass. (Outer chamber has the VANEC designation 561S-24A-MAIK.)

Apparatus 10 is, in general, constructed so that inner expansion chamber 14 preferably operates at a pressure of between about 3 and about 30 percent and more preferably, between about 3 and about 20 percent of the fluid pressure (which may be from about 100 to about 400 PSIG, although more usually between about 300 and about 400 PSIG) upstream of expander outlet opening 64. More preferably inner chamber 14 operates at about 15 PSIG. Outer expansion chamber 18, due to its large fluid discharge opening 20, is intended to operate at about atmospheric pressure.

For an unmuffled fluid venting noise level in the range of about 110 to about 140 dB (measured on the "A" scale) and an associated noise frequency range of between about 200 and about 500 Hz, apparatus 10, when constructed in the described manner, provides a noise frequency increase (in outer chamber 18) to a range of about 2000 to about 16,000 Hz and provides a noise level outside the apparatus (attributable to the flow of gaseous fluid into and through the apparatus) of no more than about 95 dB.

Although there has been described herein a noise suppression and particle separation apparatus, especially, but not necessarily, for venting high pressure and velocity, particulate-laden geothermal steam, in accordance with the present invention for purposes of illustrating the manner in which the invention may be used to advantage, it is to be appreciated that the invention is not limited thereto. For example, although diffusing means 16 are shown in FIG. 1 as comprising four circumferential rows of four elements 90, as few as one row and as many rows as desired may alternatively be provided; each row may have fewer or more than the four elements 90. Neither is it required that the rows of elements 90 be equally spaced apart, nor that each row have the same number of elements, nor that the elements in any row be equally spaced apart. Likewise, the number and pattern of openings 96 is elements 90 may be varied from the above described pattern in which six circumferential rows, each having 12 equally spaced openings, are provided.

Moreover, the ratio of the combined area of the inner chamber apertures 84 to the inside, transverse cross sectional area of inner chamber 14 may be greater or less than about one, as may the ratio of the combined area of element openings 96 in any element to the inner, transverse cross sectional area of the element. Relative transverse cross sectional diameters and areas of riser 42, inner chamber 14 and outer chamber 18 may also be varied from the relative sizes mentioned above. Furthermore the number and arrangement of sound deadening elements 160 installed upstream of outer chamber discharge opening 20 may be varied from the annular arrangement shown in FIGS. 1 and 2 and described above. Still further, sumps 22 and/or 24 may be eliminated if apparatus 10 is to be used principally for sound suppression purposes.

Gaseous fluid flow rates substantially different than that described in the above Example can, in general, be accomodated by scaling the apparatus described in the Example up or down in size.

Accordingly, any and all modifications and variations which may occur to those skilled in the art are to be considered to be within the scope and spirit of the invention as defined in the appended claims.

What is claimed is:

1. A noise suppression apparatus for quieting a flow of high pressure, high velocity, gaseous fluid, the apparatus comprising:
   (a) a fluid conduit having an inlet end for receiving a flow of high pressure, gaseous fluid and an outlet end for discharging said fluid flow;
   (b) an inner expansion chamber disposed around the outlet end of the fluid conduit for receiving therefrom said flow of gaseous fluid and for enabling the received flow to expand to a first, substantially reduced pressure, said inner expansion chamber having a side wall with at least one fluid discharge aperture therethrough;
   (c) flow diffusing means for receiving the flow of fluid from said at least one discharge aperture and for diffusing said received flow;
   (d) an outer expansion chamber disposed around the inner expansion chamber and the flow diffusing means for receiving from the diffusing means the diffused flow of gaseous fluid and for enabling the received flow to expand to a second, substantially reduced pressure, said outer expansion chamber having a comparatively large gaseous fluid discharge opening therein; and
   (e) means disposed in the outer expansion chamber for suppressing the noise caused by the flow of gaseous fluid entering and flowing through the apparatus.

2. The apparatus as claimed in claim 1 wherein the gaseous fluid flow has particulates entrained therein and wherein said inner and outer expansion chambers and said flow diffusing means are relatively configured and oriented for causing the flow of gaseous fluid from the fluid conduit to abruptly change flow directions a plurality of times so as to cause particulates entrained in said flow to be disengaged therefrom, and including means for receiving said disengaged particulates.

3. The apparatus as claimed in claim 1 wherein the inner expansion chamber side wall has a plurality of flow discharge apertures and wherein the flow diffusing means comprise a like plurality of flow diffusing elements, each of said elements being connected to the inner expansion chamber side wall so as to receive a divided flow of gaseous fluid from a corresponding flow discharge aperture formed through said side wall, and so as to project outwardly from said side wall into the outer expansion chamber.

4. The apparatus as claimed in claim 3 wherein each of the diffusing elements comprises a relatively short fluid conduit closed at the outer end and having a side wall with a number of small, flow diffusing openings therethrough.

5. The apparatus as claimed in claim 4 wherein the total combined area of all of the flow diffusion openings in the side wall of each of the diffusing elements is at least about as great as the transverse cross sectional area of the associated element.

6. The apparatus as claimed in claim 3 wherein the diffusion elements are similar to one another and wherein the total area of the flow diffusion openings of all the elements is at least about as great as the transverse cross sectional area of the inner expansion chamber in the region of the elements.

7. The apparatus as claimed in claim 1 wherein the inner expansion chamber is generally cylindrical and has a transverse cross sectional area which is substantially greater than the area of the fluid conduit outlet end.

8. The apparatus as claimed in claim 7 wherein the outer expansion chamber is generally cylindrical and has a transverse cross sectional area substantially greater than the transverse cross sectional area of the inner expansion chamber in the region of the flow diffusing means.

9. The apparatus as claimed in claim 8 wherein an upper end of the outer expansion chamber is substantially open and defines the fluid flow discharge opening of the apparatus.

10. The apparatus as claimed in claim 1 wherein the fluid conduit outlet end diverges in diameter, the fluid conduit outlet end thereby having a substantially greater diameter than that of the fluid conduit upstream of said outlet end.

11. The apparatus as claimed in claim 1 wherein the inner expansion chamber is generally cylindrical and has a closed top having an inner, fluid impingement surface, the inner expansion chamber being axially disposed around the outlet end of the fluid conduit with said fluid impingement surface relatively adjacent to the fluid conduit outlet end and in the path of fluid discharged therefrom.

12. The apparatus as claimed in claim 11 wherein said inner expansion chamber includes a replaceable wear member at the top thereof, said impingement surface being on said wear member.

13. The apparatus as claimed in claim 1 wherein said noise suppressing means comprises an annular sound absorbing member installed in the outer expansion chamber outwardly of the fluid flow diffusing means.

14. The apparatus as claimed in claim 1 wherein the noise suppressing means comprises a plurality of sound deadening elements disposed in the outer expansion chamber just upstream of the fluid discharge opening and in the discharge flow path of the gaseous fluid.

15. The apparatus as claimed in claim 1 wherein the flow of gaseous fluid has a preestablished flow rate and a preestablished pressure in the fluid conduit, and wherein the inner expansion chamber, diffusing means and outer expansion chamber are relatively configured for causing the reduced pressure in the inner expansion chamber to be between about 3 and about 30 percent of the gaseous fluid pressure in the fluid conduit just upstream of the outlet end thereof.

16. The apparatus as claimed in claim 15 wherein the apparatus is configured to operate at the preestablished flow rate of between about 20,000 and about 45,000 pounds per hour and wherein the preestablished pressure is between about 100 and about 400 PSIG.

17. The apparatus as claimed in claim 1 wherein the outer expansion chamber is configured to operate at about atmospheric pressure.

18. The apparatus as claimed in claim 1 wherein the inner chamber and the fluid diffusing means are configured for causing an audio frequency range of the fluid flow noise to be substantially increased over a lower audio frequency range of the noise caused by said flow discharging from the fluid conduit outlet end into the inner expansion chamber.

19. The apparatus as claimed in claim 18 wherein for the lower audio frequency range is between about 200 and about 500 Hz, the increased audio frequency range is between about 2000 Hz and about 16,000 Hz.

20. The apparatus as claimed in claim 18 wherein the noise suppressing means is selected for absorbing noise in said increased audio frequency range and for providing a noise level outside the apparatus, due to the flow of gaseous fluid into and through the apparatus, which is no greater than about 95 dB on the "A" dB noise scale.

21. A noise suppression and particle separation apparatus for venting a flow of high pressure, high velocity, particle-laden, gaseous fluid from a geothermal steam wellhead into the atmosphere, the apparatus comprising:
(a) a fluid conduit having an inlet end for receiving a flow of high pressure, particle-laden, gaseous fluid from a geothermal steam wellhead and having a fluid discharge opening with a diameter, $D_1$;
(b) a cylindrical, inner expansion chamber axially disposed around a discharge end region of the fluid conduit for receiving from the discharge opening the flow of gaseous fluid, said inner expansion chamber having a diameter, $D_2$, which is substantially greater than said discharge opening diameter, $D_1$, to thereby permit the fluid to expand to a first, substantially reduced pressure, said inner expansion chamber having a side wall with a plurality of fluid flow discharge apertures therethrough;
(c) a like plurality of flow diffusing elements, each of said elements being connected to the inner expansion chamber to receive and diffuse the fluid flow from a corresponding chamber discharge aperture and to project outwardly from said inner expansion chamber;
(d) a cylindrical outer expansion chamber axially disposed around the inner expansion chamber and the flow diffusing elements for receiving from the elements the diffused flow of gaseous fluid, said outer expansion chamber having a diameter, $D_3$, which is substantially greater than the inner chamber diameter, $D_2$, to thereby permit the fluid to expand to a second, substantially reduced pressure, said outer expansion chamber having an open upper end through which the flow of gaseous fluid is discharged from the apparatus; and
(e) means disposed in the outer expansion chamber for suppressing noise therein caused by said flow of gaseous fluid into and through the apparatus.

22. The apparatus as claimed in claim 21 wherein the inner and outer expansion chambers and the flow diffusing elements are relatively configured and oriented for causing the flow of gaseous fluid from the fluid conduit to abruptly change flow direction and velocity a plurality of times before the flow is discharged from the outer expansion chamber into the atmosphere, thereby causing particulates entrained in said flow to be disengaged therefrom, and including means for receiving said disengaged particulates.

23. The apparatus as claimed in claim 21 wherein each of the flow diffusing elements comprises a relatively short, cylindrical fluid conduit having a diameter substantially smaller than the inner chamber diameter, $D_2$.

24. The apparatus as claimed in claim 23 wherein each of the flow diffusing elements is closed at the outer end and has a side wall with a number of small, fluid discharge openings therethrough.

25. The apparatus as claimed in claim 24 wherein the combined area of all of the openings through the side wall of any of the elements is at least about as great as the transverse cross sectional area of the associated element and wherein the total area of the discharge openings of all of the diffusing elements is at least about as great as the transverse cross sectional area of the inner expansion chamber in the region of said elements.

26. The apparatus as claimed in claim 21 wherein the inner expansion chamber is generally cylindrical and has a closed top comprising a wear member having a fluid impingement surface, the inner expansion chamber being axially disposed around the fluid discharge opening of the fluid conduit with the fluid impingement surface relatively adjacent to the fluid conduit discharge opening and in the path of fluid discharged therefrom.

27. The apparatus as claimed in claim 26 including means for detachably connecting said wear member to the inner expansion chamber top.

28. The apparatus as claimed in claim 21 wherein said noise suppressing means comprises an annular sound absorbing member installed around the inside of the outer expansion chamber outwardly of the fluid diffusing elements.

29. The apparatus as claimed in claim 21 wherein the noise suppressing means comprises a plurality of annular sound deadening elements coaxially mounted in the outer expansion chamber just upstream of the open upper end thereof and in the path of the gaseous fluid flow.

30. The apparatus as claimed in claim 21 wherein the flow of gaseous fluid is at a preestablished flow rate and at a preestablished pressure in the fluid conduit, and wherein the inner chamber, the diffusing elements and the outer chamber are relatively configured for causing the first, substantially reduced pressure in the inner chamber to be between about 3 and about 30 percent of said preestablished pressure and wherein the outer chamber is configured for causing the second, substantially reduced pressure to be about atmospheric pressure.

31. The apparatus as claimed in claim 21 wherein the inner chamber and the fluid diffusing elements are configured for causing an audio frequency range of the fluid flow noise to be substantially increased over a lower audio frequency range of the noise caused by said flow discharging from the fluid conduit discharge opening into the inner chamber.

32. The apparatus as claimed in claim 31 wherein the lower audio frequency range is between about 200 and about 500 Hz and the increased audio frequency range is between about 2000 Hz and about 16,000 Hz.

33. The apparatus as claimed in claim 31 wherein the noise suppressing means is selected for absorbing noise in said increased audio frequency range and for providing a noise level outside the apparatus, caused by the flow of said gaseous fluid into and through the apparatus, which is no greater than about 95 dB on the "A" dB scale.

34. A noise suppression and particle separation apparatus for venting a flow of high pressure, high velocity, particle-laden, gaseous fluid from a geothermal steam wellhead into the atmosphere, the apparatus comprising:

(a) a fluid conduit having an inlet end for receiving a flow of high pressure, high velocity, particle-laden, gaseous fluid from a geothermal steam wellhead and comprising a vertically directed riser with a flow discharge opening at an outlet end thereof having a diameter, $D_1$;

(b) a generally cylindrical, inner expansion chamber axially disposed around the discharge opening of said riser for receiving therefrom said flow of gaseous fluid; said inner expansion chamber having a diameter, $D_2$, which is at least about twice said discharge opening diameter, $D_1$, to enable the flow of gaseous fluid to expand to a first, substantially reduced pressure which is between about 3 and about 30 percent of the fluid pressure in the riser upstream of the discharge opening, said inner expansion chamber having a side wall with a plurality of fluid flow dividing discharge apertures therethrough;

(c) a like plurality of flow diffusing elements, each of said elements being connected to the inner expansion chamber to receive and diffuse the flow of gaseous fluid from a corresponding chamber discharge aperture and to project outwardly from said inner expansion chamber, each of said elements having a side wall with a number of small fluid discharge openings therethrough, the combined area of said element discharge openings of each of said elements being at least about as great as the transverse cross sectional area of the associated element;

(d) a cylindrical outer expansion chamber axially disposed around the inner expansion chamber and the flow diffusing elements for receiving from the elements the diffused flow of gaseous fluid, said outer expansion chamber having a diameter, $D_3$, which is substantially greater than the inner chamber diameter, $D_2$, so as to permit the gaseous fluid to expand to a second, substantially reduced pressure, said outer expansion chamber having an open upper end through which the flow of gaseous fluid is discharged from the apparatus; and (e) means disposed in the outer expansion chamber for suppressing noise therein caused by said flow of gaseous fluid into and through the apparatus, said noise suppressing means including an annular sound absorbing member installed outwardly of, and around, the diffusing elements and further including a plurality of radially spaced apart, annular sound absorbing members installed in the outer expansion chamber just upstream of the open upper end thereof and in the path of the gaseous fluid flow.

35. The apparatus as claimed in claim 34 wherein an audio frequency of the noise caused by the flow of gaseous fluid discharging from the fluid conduit discharge opening into the inner expansion chamber is in a range of between about 200 and about 500 Hz, wherein the noise caused by the flow of fluid discharging from the flow diffusing elements is in an increased frequency range of between about 2000 and about 16,000 Hz and wherein the noise suppressing means is selected for absorbing noise in said increased frequency range and for causing the noise level outside the apparatus caused by the venting of said flow of gaseous fluid into and through the apparatus to be no more than about 95 dB on the "A" dB scale.

36. The apparatus as claimed in claim 34 wherein the inner and outer expansion chambers and the flow diffusing elements are relatively configured and oriented so as to cause the direction and velocity of the gaseous fluid flowing through the apparatus to abruptly change direction and velocity a plurality of times to thereby disengage particulates entrained in the flow of fluid and wherein the inner and outer expansion chambers have sumps in lower regions thereof for receiving said disengaged particulates.

37. The apparatus as claimed in claim 36 including means for enabling the draining of liquid from said sumps.

38. The apparatus as claimed in claim 34 wherein the riser substantially diverges in transverse cross sectional area just upstream of the discharge opening therein so as to permit the flow of gaseous fluid to expand before flowing into the inner expansion chamber.

39. The apparatus as claimed in claim 38 wherein the fluid conduit includes a flow inlet section upstream of the riser, the inlet section having a smaller diameter than the riser so as to permit the gaseous fluid to expand as it flows into the riser.

40. The apparatus as claimed in claim 39 including means for connecting the inlet section of the fluid conduit to an existing geothermal steam vent conduit.

* * * * *